United States Patent [19]

Jasenof et al.

[11] Patent Number: 4,720,403

[45] Date of Patent: Jan. 19, 1988

[54] ANTICORROSIVE COATING COMPOSITIONS

[75] Inventors: Kenneth E. Jasenof, Des Plaines; Ronald J. Lewarchik, Arlington Hts.; John Smyrniotis, Chicago, all of Ill.

[73] Assignee: DeSoto, Inc., Des Plaines, Ill.

[21] Appl. No.: 894,293

[22] Filed: Aug. 7, 1986

[51] Int. Cl.$^4$ ............................................. C08K 3/10
[52] U.S. Cl. .................................. 427/327; 427/386; 427/410; 523/458; 523/466
[58] Field of Search ............... 523/451, 458, 466; 427/327, 386, 410

[56] References Cited

U.S. PATENT DOCUMENTS 3,896,187  7/1975  Weil ..................................... 523/451
4,433,014  2/1984  Gaske et al. ........................ 523/466
4,605,570  8/1986  Felter et al. ........................ 523/451

Primary Examiner—Lewis T. Jacobs
Attorney, Agent, or Firm—Dressler, Goldsmith, Shore, Sutker & Milnamow, Ltd.

[57] ABSTRACT

A primer coating system is disclosed that is resistant to abrasion and corrosion and includes a basecoat or first layer comprising a resinous polyepoxide, an aminoplast, phenoplast or blocked isocyanate curing agent, an epoxy-phosphate, a chromium-containing pigment and a clay that has the capacity to fix phosphate. The system may further include an overcoat or second layer comprising a resinous polyhydric alcohol, a polyisocyanate, a chromium-containing pigment and the foregoing clay, and a third layer of a finish coating preferably based on a fluorine-containing polymer.

25 Claims, No Drawings

ANTICORROSIVE COATING COMPOSITIONS

DESCRIPTION

1. Technical Field

The present invention relates to coating compositions for use as primer coatings on metal surfaces to provide coated surfaces that exhibit improved resistance to abrasion and corrosion. The invention includes coating systems which employ such primer coatings.

2. Background of the Invention

Corrosive agents including salt spray, nitrogen dioxide and sulfur dioxide reduce the long-term performance of painted and unpainted metal surfaces. This has recently become a more serious problem in many geographical areas with the increase in acidity of the atmosphere and the resulting acid rain. Primer coatings applied to a metal surface before application of a finish coating can increase the level of protection.

Primer coatings can be applied by a variety of methods including brush, spray and immersion techniques. One particularly useful method for coating a large surface area is a coil coating process wherein a coiled metal sheet is unrolled to expose the metal surface, the surface is coated by roll coating, the coating is cured and the metal sheet is recoiled in a continuous operation.

For example, coil coating techniques may be employed to coat sheets of galvanized steel that are used in the construction industry for wall and roofing panels. Strands of galvanized steel wire and the like may also be coated by coil coating techniques.

As indicated above, a coated metal surface is more resistant to corrosion than an uncoated metal surface. A coating, to be considered suitable for application by coil coating techniques, however, must be able to withstand severe deformation without disrupting the continuity of the coating. This is particularly important in the production of wall and roofing panels which comprise coated metal sheets that are bent or formed to a given configuration. Any fracture or break in the coating as the metal surface is bent during forming would provide an area susceptible to corrosion.

Primer coating compositions can include single layer and multilayered films. The primer coating compositions of the prior art, when applied as thick films, generally lack the ability to satisfactorily withstand deformation as the coated metal substrate is formed.

For example, U.S. Pat. No. 4,433,014 to Gaske et al. discloses pigmented, corrosion resistant, thermosetting coating compositions that include a resinous polyepoxide, a phenoplast resin crosslinking agent, a phosphoric acid ester catalyst, a chromium-containing pigment and a clay having the capacity to fix phosphate. The phosphoric acid ester catalysts of these coating compositions do not function particularly well in combination with aminoplast resins, so it was necessary to use phenoplast resins as the crosslinking agents. Moreover, such compositions are not well-suited for use in coil coating applications because the coatings did not exhibit sufficient resistance to the stresses incurred in coil coating processes. These compositions were therefore typically applied to preformed panels by spraying.

Thus, a need exists for primer coating compositions that are flexible after curing, capable of withstanding severe forming conditions without film fracture and can be applied as thick films to metal surfaces to improve resistance to abrasion and corrosion.

DISCLOSURE OF THE INVENTION

The present invention relates to pigmented, corrosion and abrasion resistant, thermosetting organic solvent solution coating compositions that are suitable for use as protective primer coatings on metal surfaces. More than one coating may be applied to a metal surface (for example, a galvanized steel substrate) to provide a multilayered protective primer coating in the form of a multilayered film which provides the desired thickness by means of the several layers.

When a two layered primer coating is employed, the layer formed on the surface of the metal substrate is referred to as a basecoat or first primer composition. The layer formed on the basecoat is referred to as an overcoat or second primer composition. The primer-coated substrate can be topcoated with a finish coating to provide the final product.

The basecoat or first primer composition preferably comprises from about 50 to about 70 percent resin solids, based on the total weight of the composition to enable coil coating and the application of relatively thick coatings. However, this invention includes the application of thinner coatings and spray application, so lower resin solid contents are included in this invention.

The base coats in this invention are thermosetting solvent solution coating compositions on which the resin solids comprise from about 50 percent to about 85 percent of a resinous polyepoxide, from about 10 percent to about 20 percent of an aminoplast, phenoplast or blocked isocyanate curing agent for the polyepoxide and from about 5 percent to about 30 percent of an epoxy-phosphate which is preferably provided as an aqueous dispersion of at least partially neutralized epoxy-phosphate. This neutralization is with a volatile amine, including ammonium-containing compounds.

Throughout this application, all parts and proportions are by weight, unless otherwise specified.

The remaining portion, usually about 30 to 50 percent of the total weight of the first primer composition, comprises from about 10 to about 40 percent, based on the total weight of the composition, of an anticorrosive chromium-containing pigment and may also include a clay that has the capacity to fix phosphate. The use of chromium-containing pigments in corrosion resistant coatings is well known, and the use of strontium chromate is described herein as illustrative. Clays that are often used to fix phosphate include kaolin clays.

The composition can further include an amount of a thickening agent sufficient, preferably less than about 2 percent by weight, to stably disperse the chromium-containing pigment and a polar solvent in an amount sufficient, preferably less than about 2 percent by weight, to allow the thickening agent to exhibit its thickening action.

The first primer composition is preferably applied to the metal surface in an amount sufficient to form a layer have a thickness of from about 0.1 to about 0.6 mils, more preferably from 0.2 to 0.4 mils. The coating composition may, of course, be applied to form a thicker layer, but a thickness of 0.1 to 0.6 mils is usually sufficient to provide the desired abrasion and corrosion resistance.

The application of any coating composition of this invention may be accomplished by roll coating, immersion, spraying or other techniques recognized in the art. As previously indicated, roll coating is preferred.

The first primer coating may be used alone to form the primer coating, but an overcoat of a second primer coating is preferably applied.

The overcoat or second primer composition may comprise from about 10 to about 80 percent resin solids based on the total weight of the composition. The resin solids comprise from about 20 percent to about 90 percent of a resinous polyhydric alcohol having groups reactive with isocyanate groups and from about 10 percent to about 80 percent of a polyisocyanate. The resinous polyhydric alcohols may be any solvent-soluble, hydroxy-functional resin having a hydroxyl value of from 50 to 300, preferably from 70 to 150. The polyisocyanates are also conventional. These materials will be more fully discussed hereinafter.

The remaining 40 to 60 percent of the total weight of the second primer composition comprises from about 10 to about 40 percent, based on the total weight of the composition, of an anticorrosive chromium-containing pigment and may also include a clay that has the capacity to fix phosphate. As with the first primer composition, the second primer composition can also include an amount of a thickening agent sufficient, preferably less than about 2 percent by weight, to stably disperse the anticorrosive pigment and a polar solvent in an amount sufficient, preferably less than about 2 percent by weight, to allow the thickening agent to exhibit its thickening action.

The second primer composition may be applied over the first primer composition in an amount sufficient to form a layer, preferably having a thickness from about 0.6 to about 1.4 mils, more preferably from 0.8 to 1.0 mil, although the layer can have a thickness outside that range depending on intended use of the coated surface.

A topcoat or finish coating can also be used in a multilayered coating according to this invention. Any conventional finish coating may be used such as a fluorocarbon topcoat containing a polymer of vinylfluoride or vinylidene fluoride, preferably polyvinylidene fluoride, which is commercially available under the trade name FLUROPON from DeSoto, Inc., Des Plaines, Ill.

The finish coating is preferably pigmented with pigments capable of resisting a high temperature bake and applied over the second primer composition in an amount sufficient to form a layer having a thickness from about 0.7 to about 1.3 mils, more preferably from 0.8 to 1.0 mil.

Thus, a thick film coating according to this invention can include a plurality of layers including a first layer on a metal surface of the foregoing first primer composition having a thickness preferably from about 0.1 to about 0.6 mils, a second layer of the foregoing second primer composition having a thickness preferably from about 0.6 to about 1.4 mils and a third layer of a foregoing topcoat or finish coating having a thickness preferably from about 0.7 to about 1.3 mils.

With reference to the first primer composition, any organic solvent-soluble resinous polyepoxide may be used. By a polyepoxide is meant an epoxide having a 1,2-epoxy equivalency of at least about 1.3. Diepoxides are preferred, especially diglycidyl ethers of bisphenols having a 1,2-epoxy equivalency in the range of 1.3-2.0.

The term "bisphenol" denotes a pair of phenolic groups linked together through an intervening divalent structure which is usually an alkylene group. When the phenolic OH groups on each of the phenol portions of the bisphenol are in the para position, and using 2,2-propylene as the intervening divalent structure, the product is a commercially available material known as bisphenol A.

The suitable bisphenols are well known, and bisphenol A is used in commerce. Diglycidyl ethers of bisphenol A are commercially available and such materials may be used herein. These may have a molecular weight of from about 350 to about 10,000. It is preferred to employ those polyepoxides having a 1,2-epoxy equivalency of from 1.7–2.0 and an average molecular weight (by calculation) of from about 500 up to about 10,000. A molecular weight of from about 2,000 to about 10,000 is particularly preferred. The use of Epon 1009 from Shell Chemical Company, Houston, TX, which has a molecular weight of about 8,000, is described herein. Epon 1007 (also available from Shell) has a molecular weight of about 4,500 and further illustrates suitable polyepoxides.

An organic solvent-soluble, heat-hardening aminoplast resin may be used including melamines, ureas, benzoguanamines, glycourils, water-dispersible aminoplasts and the like. Other typical aminoplast resins include hexamethoxymethl melamine and water dispersible transethers thereof. Urea-formaldehyde condensates are particularly preferred because these provide superior fabrication properties when the compositions are used in coil coating and subsequently fabricated.

The use of the epoxy-phosphate dispersion catalysts described herein enables the use of aminoplast resins as curing agents, whereas in the compositions of the prior art, phenoplast resins were required to cure the coatings. See, for example, U.S. Pat. No. 4,433,014 to Gaske et al. as described above. It is a capacity to use the aminoplast resins which allows the use of urea-formaldehyde condensates which provide a coating that can withstand the stresses encountered in the fabrication of coated surfaces by coil coating techniques.

Phenoplast resins are also well known and are known curing agents of polyepoxides. If the primer coating composition is to be spray applied to preformed panels, and not coil coated, then phenoplast resins may be used as curing agents. These are solvent-soluble, heat-hardening, reaction products of formaldehyde with phenol, xylol or a derivative thereof, like bisphenol A or t-butyl phenol. Xylolol-formaldehyde condensates are the preferred phenoplast resins since other phenolics do not possess the same excellent color stability, but other phenoplast resins are otherwise fully useful. Xylololformaldehyde condensates are commercially available and one representative class includes the Methylon resins sold by General Electric.

The relative proportions of aminoplast (or phenoplast) to resinous polyepoxide are known and are not the essence of this invention. It is convenient to use a weight ratio of aminoplast (or phenoplast) to polyepoxide of from about 1:1 to about 1:15, more preferably from 1:2 to 1:8.

In order to provide the desired resistance to corrosion, it is important to include materials in the primer coating composition that provide both anionic and cationic protection.

The desired anionic protection is provided by the presence of the chromium-containing pigment which is used in a pigment to binder weight ratio of from about 0.1:1 to about 0.6:1, preferably from 0.2:1 to 0.5:1. The binder comprises the polyepoxide and the aminoplast (or phenoplast). Chromium-containing pigments that provide corrosion protection are well known and are illustrated herein by strontium chromate.

The desired cathodic protection is provided by the epoxy-phosphate component. Epoxy-phosphates are provided by reacting any resinous polyepoxide, such as those noted hereinbefore, with phosphoric acid to cause reaction of one of the three P-OH groups with the oxirane group of the polyepoxide. At least 0.05 mole of phosphoric acid is used per oxirane equivalent. The reaction is normally carried out in organic solvent solution. All the oxirane groups can be consumed by reaction with the phosphoric acid, but this is not preferred. The epoxy-phosphate may be used as such, or after neutralization with an amine, and even after dispersion of the neutralized epoxy-phosphate in water.

For example, an oxirane-free epoxy phosphate may be used herein by reacting a resinous polyepoxide with from 0.05 to 0.9 mole, preferably from 0.1 to 0.7 mole, and most preferably from 0.2 to 0.5 mole of orthophosphoric acid per equivalent of oxirane in the polyepoxide using a process in which a water miscible organic solvent in admixture with orthophosphoric acid (which contains a limited amount of water) is heated to reaction temperature together with an amount of water such that the total amount of water is sufficient to hydrolyze that portion of the oxirane functionality in the polyepoxide which does not react with the phosphoric acid. The epoxy-phosphate so-produced can be used as such, or it can be used with an amine like diethylamine. Indeed, the neutralized epoxy-phosphate can be used after dispersion in water. The small amount of water so-introduced into the solvent solution coatings of this invention are not harmful.

The resinous polyepoxide is preferably added slowly (incrementally) to the heated mixture of solvent, phosphoric acid and water so that reaction with phosphoric acid and hydrolysis of the oxirane groups will occur simultaneously to consume the added epoxy functionality quickly and thereby minimize the concentration of oxirane functionality in the reaction mixture as the reaction proceeds. This minimizes epoxy-epoxy reactions which increase the molecular weight of the product which is not preferred.

The proportion of water can be increased above the minimum specified above and may exceed the equivalents of polyepoxide. The amount of water is preferably sufficient to consume at least about 50 percent and more preferably at least about 75 percent of the oxirane functionality in the epoxy resin reactant, but this merely represents present preferred practice.

The temperature of reaction for the production of the hydrolyzed epoxy phosphates can vary from about 80° C. to about 130° C. Under these moderate conditions, the reaction is limited to essentially only one of the three OH groups in the orthophosphoric acid. It is preferred to use a relatively high boiling solvent, like 2-butoxy ethanol, and to use reaction temperatures near the boiling point of water, e.g., 90° C., to 105° C.

While any water miscible organic solvent can be used, like acetone, butanol, isopropanol, and the like, the ether alcohols illustrated by the preferred 2-butoxy ethanol, are preferred. In the presence of the phosphoric acid, no catalyst is needed and the desired epoxy-consuming reactions proceed without it. In a preferred embodiment, more than 75 percent of the organic solvent is 2-butoxyethanol.

The presence of the phosphoric acid in the epoxy-phosphate provides acidity which can be measured. The phosphoric acid groups catalyze the cure of the aminoplast resin as well as provide the phosphate needed for acid rain resistance.

While orthophosphoric acid is usually used, pyrophosphoric acid is considered an equivalent because it generates orthophosphoric acid.

Unlike the process described in U.S. Pat. No. 4,433,014, the primer coating may be baked to thermoset the same since the epoxy-phosphate resists the baking temperature needed to provide a thermosetting cure. The epoxy-phosphate is preferably used in the presence of a clay having an anion-exchange capacity of at least about 10 milliequivalents per 100 grams, preferably at least about 20 milliequivalents. Many clays are known to have this capacity, but kaolin clays having a strong anion exchange capacity are readily available and are described herein as being preferred.

The clay may be used in a similar weight ratio as the chromium-containing pigment relative to the binder; in particular, from about 0.1:1 to 1:1, preferably from 0.3:1 to 0.8:1.

The proportion of epoxy-phosphate should be such as to provide at least 0.1 percent of orthophosphoric acid based on the solids content of the coating composition, preferably at least 0.3 percent. It is preferred to use from 0.5 percent to 1.5 percent on the same basis, and up to about 5 percent of the acid may be present, though the upper limit is not precise.

Table I illustrates a number of compositions that are suitable for use as the basecoat or first primer composition. Composition B is particularly preferred.

TABLE I

| Preparation of Basecoat Primer Composition | | | | | | |
|---|---|---|---|---|---|---|
| | COMPOSITION (parts by weight) | | | | | |
| | A | B | C | D | E | F |
| Epon 1009[1] | 142 | 142 | 143 | 142 | 114 | 143 |
| Urea-formaldehyde resin[2] | 85 | 85 | 85 | 85 | 85 | 85 |
| Cellosolve acetate[3] | 130 | 130 | 130 | 130 | 130 | 130 |
| ADD THE FOLLOWING PREMIX: | | | | | | |
| Bentone 34 gel[4] | 2 | 2 | 3 | 2 | 2 | 3 |
| Diacetone alcohol | 20 | 20 | 20 | 20 | 20 | 20 |
| MIX AND ADD: | | | | | | |
| Strontium chromate | 52 | 36 | — | 52 | 54 | — |
| Anti-Cor 70[5] | 52 | — | — | 52 | — | — |
| Kaolinite clay[6] | — | 109 | — | — | 110 | — |
| Wollasonite[7] | 156 | — | 48 | — | — | 48 |
| ZPO[8] | — | — | 120 | — | — | — |
| Titanium dioxide, rutile | — | 114 | — | — | 96 | 60 |
| Zinc oxide | — | — | 30 | — | — | — |
| Sicorin RZ[9] | — | — | — | — | — | 15 |
| Barium sulfate | — | — | 156 | — | — | — |
| Nalzin 2[10] | — | — | — | — | — | 150 |
| SANDMILL TO 6–7 and ADD: | | | | | | |
| Epon 1009[1] | 241 | 277 | 240 | 241 | 268 | 240 |
| Epoxy-phosphate dispersion[11] | 38 | 40 | 38 | 38 | 38 | 38 |

TABLE I-continued

Preparation of Basecoat Primer Composition

| | COMPOSITION (parts by weight) | | | | | |
|---|---|---|---|---|---|---|
| | A | B | C | D | E | F |
| Solvesso 100 | 114 | 77 | 84 | 50 | 90 | 84 |

[1] Epon 1009 is a diglycidyl ether of bisphenol A having an average molecular weight of 8000 and is commercially available from Shell Chemical Co., Houston, Texas. Epon 1009 was used at 40 percent by weight in a solution including 30 percent by weight Solvesso 100 and 30 percent by weight diacetone alcohol.
[2] An aminoplast curing agent that is commercially available from Reichhold Chemicals, Inc., White Plains, NY, as No. 21-511.
[3] An ethylene glycol monoethyl ether acetate solvent that is commercially available from Union Carbide Corp., Danbury, CT.
[4] An organoclay gelling agent that is commercially available from NL Chemicals, Hightstown, NJ.
[5] A zinc ferrite complex used as a corrosion inhibiting pigment that is commercially available from Mobay Chemical Corp., Pittsburgh, PA.
[6] A Kaolin clay that is commercially available from Georgia Kaolin Co., Inc., Union, NJ, under the trade name "HYDRITE R".
[7] Calcium metasilicate (CaSiO$_3$).
[8] A zinc phosphate complex used as a corrosion inhibiting pigment that is commercially available from Heubach, Newark, NJ.
[9] An organozinc complex used as a corrosion inhibiting pigment that is commercially available from BASF Corp., Holland, MI.
[10] An organozinc complex used as a corrosion inhibiting pigment that is commercially available from NL Chemicals, Hightstown, NJ.
[11] As described in Example 1 (hereinafter) or and in U.S. Pat. No. 4,425,451, the disclosure of which is incorporated herein by reference.

With reference to the overcoat or second primer composition, suitable polyhydric alcohol resins are illustrated by a hydroxy-functional polyester of glycerin and phthalic anhydride having a hydroxyl value of about 100, or a solvent-soluble copolymer of ethyl acrylate containing from 5 to 25 percent by weight, preferably about 10 percent, of a copolymerized hydroxyethyl acrylate.

The polyisocyanate can include any organic polyisocyanate, although diisocyanates are preferred. Suitable polyisocyanates are illustrated by 2,4-toluene diisocyanate and the biuret derived from the reaction with water of hexamethylene diisocyanate (which is a triisocyanate). Isophorone diisocyanate and diphenylmethane diisocyanate illustrate additional useful polyisocyanates.

Table II lists a number of second primer compositions prepared according to this invention. Of the compositions listed in Table II, Composition J is particularly preferred.

TABLE II

Preparation of Overcoat Primer Composition

| | COMPOSITION (parts by weight) | | | | | | |
|---|---|---|---|---|---|---|---|
| | G | H | I | J | K | L | M |
| LH 790[1] | — | — | — | 250 | 250 | 250 | 250 |
| Desmophen 670-90[2] | 142 | 142 | 142 | — | — | — | — |
| PM acetate[3] | 166 | 166 | 166 | — | — | — | — |
| Solvesso 150 | 84 | 84 | 84 | 80 | 80 | 80 | 72 |
| Butyl Cellosolve acetate | — | — | — | 120 | 120 | 120 | 108 |
| ADD THE FOLLOWING PREMIX: | | | | | | | |
| Bentone 34 gel[4] | 4 | 2 | 2 | 2 | 4 | 2 | 3 |
| Diacetone alcohol | 10 | 10 | 10 | 10 | 10 | 10 | 10 |
| MIX AND ADD: | | | | | | | |
| Strontium chromate | — | 60 | 60 | 60 | 100 | — | — |
| Anti-Cor 70[5] | 50 | — | — | — | — | 50 | 50 |
| Kaolinite clay[6] | — | 96 | 100 | 125 | — | — | — |
| Wollastonite[7] | 150 | — | — | — | 125 | 150 | 125 |
| Titanium dioxide, rutile | — | 70 | 100 | 100 | 60 | — | — |
| Mica | 50 | — | — | — | 50 | — | — |
| Butrol 23[8] | 100 | — | — | — | — | 100 | 150 |
| SANDMILL TO 5½-6 and ADD: | | | | | | | |
| Desmodur BL-1260-60[9] | 334 | 334 | 334 | — | — | — | — |
| LH 790[1] | — | — | — | 200 | 200 | 200 | 200 |
| Dibutyl tin dilaurate | — | — | — | 1 | 1 | 1 | 1 |
| PM Acetate[3] | 34 | 34 | 34 | 60 | 60 | 45 | 45 |
| Solvesso 150 | 16 | 16 | 16 | 40 | 40 | 30 | 30 |

[1] A polyhydric alcohol resin which contains reactive isocyanate groups that is commercially available from Dynamit Nobel of America, Inc., Rockleigh, NJ.
[2] A hydroxy-functional polyester resin that is commercially available from Mobay Chemical Corp., Pittsburgh, PA.
[3] A propylene glycol monomethyl ether acetate solvent that is commercially available from Arco Chemical Co., Philadelphia, PA.
[4] An organoclay gelling agent that is commercially available from NL Chemicals, Hightstown, NJ.
[5] Mobay Chemical Corp., Pittsburgh, PA.
[6] Commercially available from Georgia Kaolin Co., Inc., Union, NJ, under the trade name "HYDRITE R".
[7] Calcium metasilicate (CaSiO$_3$).
[8] A modified bariummetaborate that is commercially available from Buckman Laboratories, Inc., Memphis, TN.
[9] A polyisocyanate (blocked isocyanate) that is commercially available from Mobay Chemical Corp., Pittsburgh, PA.

EXAMPLE 1

Preparation of Epoxy-Phosphate Dispersion

The epoxy-phosphate dispersion of Table I may be prepared as follows or as described in U.S. Pat. No. 4,425,451 which is incorporated herein by reference.

914 parts of a diglycidyl ether of bisphenol A having an average molecular weight of about 4500 and a 1,2-epoxy equivalency of about 2.0 (Shell Chemical Company product Epon 1007 may be used) are charged to flask equipped with an addition funnel, thermometer and a reflux condenser. 440 parts of 2-butoxy ethanol are also charged to the flask and heat is applied to heat the charge to 125 degrees C. which is maintained until the polyepoxide is dissolved in the solvent.

24 parts of 85 percent orthophosphoric acid (in water) are premixed with 100 parts of 2-butoxy ethanol and the premixture is added from the addition funnel to the reactor over a 30 minute period with rapid agitation while holding the temperature at 125 degrees C. This temperature is then maintained for 2 hours, and the contents of the flask (a monoester) are allowed to cool to 80 degrees C.

44 parts of dimethyl ethanol amine are then added to the flask at 80 degrees C. temperature over a period of 15 minutes and the 80 degrees C temperature is maintained for a further 30 minutes to insure complete reaction. 1900 parts of deionized water are then added dropwise with high speed agitation to provide a stable aqueous dispersion having a nonvolatile solids content of 28.6 percent, a viscosity of U-V on the Gardner-Holdt scale and which possesses a fine particle size in the moderate viscosity noted.

An epoxy-phosphate suitable for use in this invention may also be prepared as follows.

1320 grams of 2-butoxy ethanol, 94.4 grams of 85 percent ortho phosphoric acid and 130 grams of additional water are heated to 95 degrees C. in a reactor and then 2100 grams of a diglycidyl ether of bisphenol A having a number average molecular weight of 1000 (Shell Chemical Company product Epon 1001 may be used) are added slowly over 30 minutes. The temperature is then held at 95 degrees C. for 3 hours to insure completion of all the reactions (with the phosphoric acid present and with the water). Then 480 grams of additional 2-butoxy ethanol are added to dilute the product to 55.1 percent solids content. The solution product has a Gardner-Holdt viscosity of Y-Z and an acid value (based on the nonvolatiles) of 41.5.

EXAMPLE 2

Preparation of Basecoat Primer Composition
(Composition B of Table I)

As shown in Table I in the column designated Composition B, the indicated amounts of the Epon 1009 solution, the urea-formaldehyde resin and Cellosolve acetate are combined with a premix of the Bentone 34 gel in diacetone alcohol. Thereafter, the indicated amounts of strontium chromate, kaolin clay and titanium dioxide are added with stirring. The mixture is added to a grinding mill and is ground to a 6-7 North Standard fineness gauge.

The indicated amounts of the additional Epon 1009 solution, the epoxy-phosphate dispersion of Example 1 and the solvent are added to provide Composition B.

EXAMPLE 3

Preparation of Overcoat Primer Composition
(Composition J of Table II)

As shown in Table II in the column designated Composition J, the indicated amounts of the polyhydric alcohol (LH 790) and the solvents are combined with a premix of the Bentone 34 gel in diacetone alcohol. Thereafter, the indicated amounts of strontium chromate, kaolin clay and titanium oxide are added with stirring. The mixture is added to a grinding mill and is ground to a 5½-6 North Standard fineness gauge.

The indicated amounts of LH 790, dibutyl tin dilaurate catalyst and solvent are added with stirring to provide Composition J.

A thick film primer composition of this invention was prepared by roll coating a galvanized steel substrate with a first primer composition (Example 2 - Composition B of Table I) at a thickness of about 0.3 mils. The primer composition was cured by baking as a coil at about 420 to 450 degrees Fahrenheit peak metal temperature for about 30 to 45 seconds (or under equivalent conditions). A second primer composition (Example 3 - Composition J of Table II) was roller applied over the first primer composition at a thickness of about 0.8 to 0.9 mils. The resulting primer composition was cured by baking as a coil at about 435-465 degrees Fahrenheit peak metal temperature for about 30 to 45 seconds (or under equivalent conditions).

The primed substrate provided above is finish coated by the roller application of a pigment FLUROPON topcoat. This topcoat includes 70 percent KYNAR polyvinylidene fluoride homopolymer in admixture with 30 percent of Acryloid B-44 thermoplastic acrylamide resin available from Rohm & Haas Co. (Philadelphia, PA) this solvent-based coating is pigmented with ceramic pigments to a pigment to binder weight ratio of 0.45 to 1. This coating is baked at about 480 degrees Fahrenheit peak metal temperature for about 30 to 40 seconds.

After continuous exposure to a 5 percent salt spray at 95 degrees F. for over 1000 hours (in accordance with ASTM B-117), the finish coating did not form face blisters and performed in an acceptable manner when subjected to a scribe test. This indicates the ability of the primer coating to resist corrosion upon exposure to salt and high humidity.

Solvent resistance was determined using the rub method. The rub method uses a two-pound ball hammer. The ball end is covered with several layers of cheese cloth and is secured with a rubber band. The cheese cloth is then saturated with methyl ethyl ketone and the coated surface is rubbed with the solvent-saturated cheese cloth making sure not to apply additional downward pressure. Rubbing strokes are repeated at the same location until the metal is exposed to view or 100 rubs are exceeded, whichever occurs first. Over 100 rubs were required to expose a metal surface coated with a composition of this invention.

Testing for abrasion resistance was performed using the falling sand method (ASTM D-968). This test determines the number of liters of sand (under controlled conditions) required to abrade through a coating to expose the metal surface. The more sand required to expose the metal surface, the more resistant the coating. Over 130 liters of sand were required to abrade through the foregoing primer coating.

The coatings of this invention exhibited better abrasion and salt spray resistance than the coatings of the prior art. In particular, when subjected to the falling sand test (ASTM 968), the 2 mil coating of this invention required 130 liters of sand before the metal surface was exposed. Resistance to salt spray was also enhanced.

What is claimed is:

1. A pigmented, corrosion and abrasion resistant, thermosetting organic solvent solution coating composition comprising: (a) from about 50 percent to about 85 percent of total resin solids of a resinous polyepoxide; (b) from about 10 percent to about 20 percent of total resin solids of an aminoplast, phenoplast or blocked isocyanate crosslinking agent for said polyepoxide; (c) from about 5 percent to about 30 percent of total resin solids of an epoxy-phosphate, said epoxy-phosphate being provided by reacting a resinous polyepoxide with at least 0.05 mole of orthophosphoric acid per equivalent of oxirane in said polyepoxide; and (d) a chromium-containing pigment providing resistance to corrosion.

2. The coating composition of claim 1 further including a clay having the capacity to fix phosphate.

3. The coating composition of claim 1 wherein said resinous polyepoxide is a diglycidyl ether of a bisphenol having a molecular weight of from about 500 to 10,000 and a 1,2-epoxy equivalency of at least about 1.3.

4. The coating composition of claim 1 wherein said resinous polyepoxide is a diglycidyl ether of a bisphenol having a molecular weight of at least about 2,000 and a 1,2-epoxy equivalency of at least about 1.7.

5. The coating composition of claim 1 wherein said crosslinking agent is a urea-formaldehyde condensate.

6. The coating composition of claim 1 wherein said crosslinking agent is a xylolol-formaldehyde condensate.

7. The coating composition of claim 2 wherein said epoxy-phosphate contains from 0.05 to 0.7 mole of phosphoric acid per oxirane equivalent in said polyepoxide, the balance of the oxirane functionality being consumed by hydrolysis.

8. The coating composition of claim 7 wherein said epoxy-phosphate dispersion comprises from about 10 percent to 20 percent of the total weight of the resin solids in the composition.

9. The coating composition of claim 1 wherein said chromium-containing pigment is present in a weight ratio with respect to the total weight of said polyepoxide and aminoplast or phenoplast crosslinking agent of about 0.1:1 to 0.6:1.

10. The coating composition of claim 8 wherein said chromium-containing pigment is present in a weight ratio with respect to the total weight of said polyepoxide and aminoplast, phenoplast or blocked isocyanate crosslinking agent of about 0.2:1 to 0.5:1.

11. The coating composition of claim 10 wherein said chromium-containing pigment is a chromate pigment.

12. The coating composition of claim 2 wherein said clay has an anion-exchange capacity of at least about 10 milliequivalents per 100 grams of clay.

13. The coating composition of claim 2 wherein said clay is present in a weight ratio with respect to the total weight of said polyepoxide and aminoplast, phenoplast or blocked isocyanate crosslinking agent of about 0.1:1 to 1:1.

14. The coating composition of claim 2 wherein said clay is present in a weight ratio with respect to the total weight of said polyepoxide and aminoplast, phenoplast or blocked isocyanate crosslinking agent of about 0.3:1 to 0.8:1.

15. A method of protecting a metal substrate comprising applying thereto the coating composition of claim 1 to form a first layer and then overcoating with a pigmented, corrosion and abrasion resistant, thermosetting organic solvent solution coating composition comprising (a) from about 20 to 90 percent by weight, based on the weight of resin solids, of a resinous polyhydric alcohol; (b) from about 10 to 80 percent of a polyisocyanate; and (c) a chromium-containing pigment providing resistance to corrosion to form a second layer.

16. The method of claim 15 wherein said polyisocyanate is a blocked isocyanate.

17. The method of claim 15 further including a clay having the ability to fix phosphate.

18. The method of claim 15 wherein said chromium-containing pigment is present in a weight ratio with respect to the total weight of said polyhydric alcohol of about 0.1:1 to 0.6:1.

19. The method of claim 15 wherein said chromium-containing pigment is present in a weight ratio with respect to the total weight of said polyhydric alcohol of about 0.2:1 to 0.5:1.

20. The method of claim 15 wherein said chromium-containing pigment is a chromate pigment.

21. The method of claim 17 further including a clay having an anion-exchange capacity of at least about 10 milliequivalents per 100 grams of clay.

22. The method of claim 15 in which the total thickness of the first layer and the second layer is least about 0.7 mils.

23. The method of claim 22 wherein the first layer has a thickness of at least about 0.1 mils and the second layer has a thickness of at least about 0.6 mils.

24. The method of claim 15 further including the steps of baking the coating compositions to thermoset the same, and applying a fluorine polymer-containing coating as a topcoat.

25. A method of claim 24 in which the total thickness of the first layer, the second layer and the topcoat is at least about 1.4 mils.

* * * * *